Aug. 24, 1965 M. R. AARON ETAL 3,202,762

ASYNCHRONOUS PULSE MULTIPLEXING

Filed Dec. 20, 1961 3 Sheets-Sheet 1

INVENTORS M. R. AARON
H. H. HENNING
BY R. B. Ardis
ATTORNEY

ASYNCHRONOUS PULSE MULTIPLEXING

Filed Dec. 20, 1961 3 Sheets-Sheet 2

INVENTORS M. R. AARON
H. H. HENNING
BY R. B. Ardis
ATTORNEY

Aug. 24, 1965 M. R. AARON ETAL 3,202,762

ASYNCHRONOUS PULSE MULTIPLEXING

Filed Dec. 20, 1961 3 Sheets-Sheet 3

INVENTORS M. R. AARON
H. H. HENNING
BY R. B. Ardis
ATTORNEY 3,202,762

ASYNCHRONOUS PULSE MULTIPLEXING

Marvin R. Aaron, Whippany, and Hansjuergen H. Henning, Summit, N.J., assignors to Bell Telephone Laboratories, Incorporated, New York, N.Y., a corporation of New York Filed Dec. 20, 1961, Ser. No. 160,807
4 Claims. (Cl. 179—15)

This invention relates to multiplex communication and more particularly to asynchronous pulse multiplexing systems in which the various transmitters whose pulse signals to be multiplexed are independent of one another.

As presently known there are three classes of pulse mutliplexing systems. The best known is synchronous multiplexing in which all the pulse transmitters have the same fundamental repetition frequency and multiplexing is accomplished by the time domain interleaving of pulses. To avoid the complexities of the distribution apparatus required at the receiver in synchronous systems the so-called semi-synchronous system was devised in which pulse signals from each transmitter bear their own address and sorting is accomplished at the receiver by way of suitable recognition apparatus. In the third class of multiplexing systems the transmitters are independent of one another but each transmitter must transmit some relatively complex additional information in order to identify the signals from each of the transmitters at the receiving end of the system. The usual manner of sending this additional information is by having each transmitter generate a predetermined number of pulses at predetermined intervals of time and with a predetermined amplitude distribution. At the receiving end of such a system relatively complex equipment is needed to separate the signals emanating from the various transmitters.

It is an object of this invention to eliminate the necessity for generating relatively complex identifying information in an asynchronous pulse multiplexing system.

It is a related object of this invention to eliminate the necessity for relatively complex equipment to identify the signals from the transmitters at both the receiving and transmitting ends of the system.

The pulse signals emanating from each of the pulse transmitters in this invention are independent of one another in phase, frequency and duration. In accordance with this invention they are multiplexed by first separating the signals from each of the pulse transmitters in the frequency domain, adding the resulting signals and transmitting the summed signal. At the receiving end of the system a series of bandpass filters is used in separate channels to produce signals having the characteristics of double sideband amplitude modulated signals whenever a pulse is generated by one of the transmitters and conventional amplitude modulation techniques are used to detect the pulses emanating from each transmitter then regenerated.

This invention will be more fully comprehended from the following detailed description, taken in conjunction with the drawings, in which.

Figure 1:
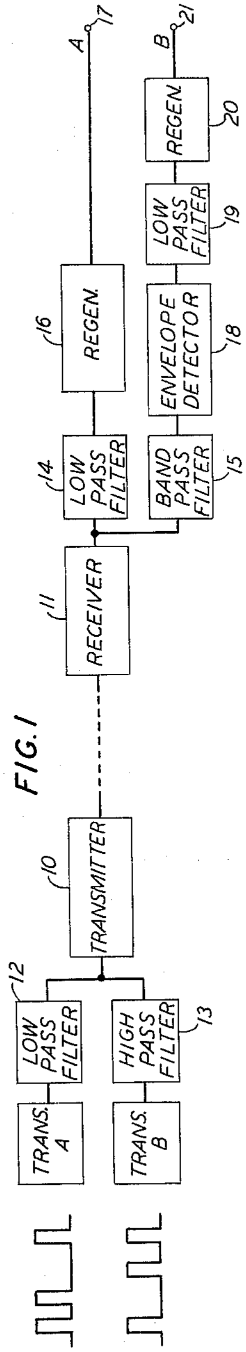
FIG. 1 is a block diagram of an asynchronous multiplexing system for multiplexing the signals from two pulse transmitters which embodies the invention.

In the embodiment of the invention shown in FIG. 1 pulse signals emanating from transmitter A and transmitter B are to be multiplexed and transmitted over the transmission medium comprising transmitter 10 and receiver 11. Pulse transmitters A and B are totally independent of one another in that the rate at which each of them generates pulses does not affect the operation of the system, and these pulses are neither separated in the time nor frequency domains. The pulses from transmitter A are applied to a low-pass filter 12 which attenuates the high frequency components of the pulses, and the output of low-pass filter 12 is directly applied to the transmitter 10. The pulses from transmitter B are applied to a high-pass filter 13 which attenuates the low frequency components of the pulses from transmitter B and passes the high frequency components. The only relationship required between filters 12 and 13 is that the cut-off frequency of the low-pass filter be less than the lowest frequency of the transmission band of the high-pass filter and that a finite portion of the frequency spectrum of the pulses from transmitter A fall within the transmission band of the low-pass filter and a finite portion of the frequency spectrum of the pulses from transmitter B fall within the transmission band of the high-pass filter 13. The output of the high-pass filter 13 is applied to the transmitter 10 so that the outputs of both filters 11 and 12 are transmitted directly. The resulting signals are thus separated in the frequency domain and transmitted as such.

The transmitter 10 may, for example, comprise a frequency modulated transmitter which the outputs from the filters 12 and 13 modulate. At the receiving terminal a frequency modulated receiver 11 recovers the combined signals emanating from filters 12 and 13 and applies them to a low-pass filter 14 and a bandpass filter 15. The output of the low-pass filter is connected to the input of a pulse regenerator 16 which may, for example, comprise a simple blocking oscillator. The input signal threshold level at which the regenerator 16 will generate an output pulse is experimentally obtained by transmitting a pulse from transmitter A, measuring the resulting output amplitude from low-pass filter 14 and then setting the threshold level to one half that amplitude. The threshold level may, of course, be set to values other than one half the measured amplitude of the output of filter 14 when a pulse from transmitter A has been transmitted, but with a relatively simple regenerator that amplitude yields maximum accuracy of regeneration. Accordingly, when the transmitter A generates a pulse, regenerator 16 generates an output pulse at terminal 17.

Figure 3B:
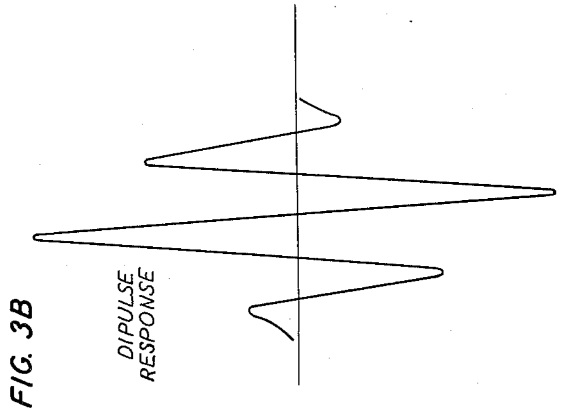
FIGS. 3A and 3B illustrate the responses of a bandpass filter to a pulse input and a dipulse input, respectively.
Figure 3A:
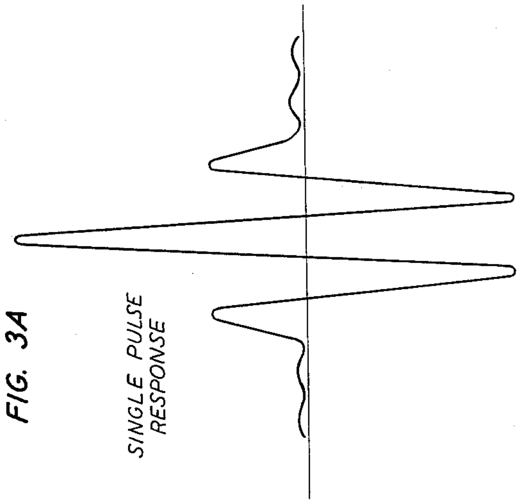

The output of receiver 11 is also applied to the input of bandpass filter 15 whose bandpass frequency transmission band is such that the frequency spectrum of the output of filter 13 is within that transmission band, and the response of the bandpass filter 15 to a pulse input is shown in FIG. 3A. The filter 15 whose response is shown in FIG. 3A has a cosine square type amplitude characteristic which has an associated phase characteristic that is approximately linear, but the only requirement is that of employing a bandpass filter that has a phase characteristic that is approximately linear. As can be seen from the response of the filter shown in FIG. 3A the output of the bandpass filter bears a strong resemblance to a double sideband amplitude modulated signal which has been modulated by a pulse. In this case the "carrier frequency" is the center frequency of the bandpass filter 15.

Since the output of bandpass filter 15 so closely resembles double sideband amplitude modulated signals the pulses from transmitter B are obtained by applying the output of filter 15 to an envelope detector 18 to obtain the envelope of the pulses from transmitter B. This envelope is then applied to a low-pass filter 19 to smooth the envelope thereby obtained and then to a regenerator 20 whose output is applied to terminal 21. The regenerator 20 may comprise, for example, a simple blocking oscillator with its threshold level set to one half the amplitude of the output of low-pass filter 19 when transmitter B generates a pulse, and, as in the case of regenerator 16, this value may be obtained by having transmitter B generate an output pulse, measuring the output of filter 19 and setting the threshold level of regenerator 20 to one half that amplitude. Again, other threshold levels may be employed.

Figure 2A:
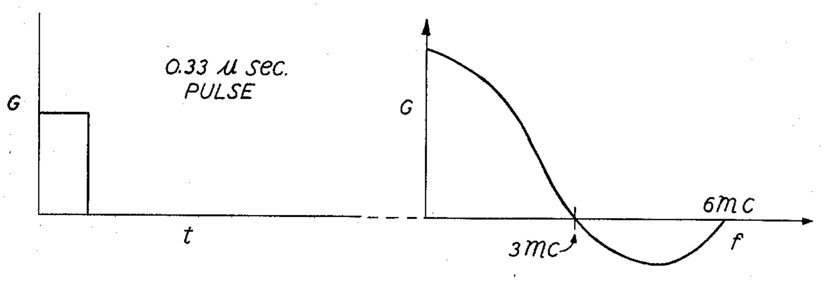
FIGS. 2A through 2C illustrate the frequency spectra of various pulses.
Figure 2B:
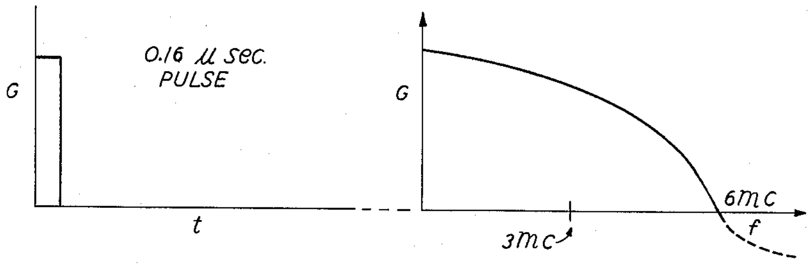
Figure 2C:
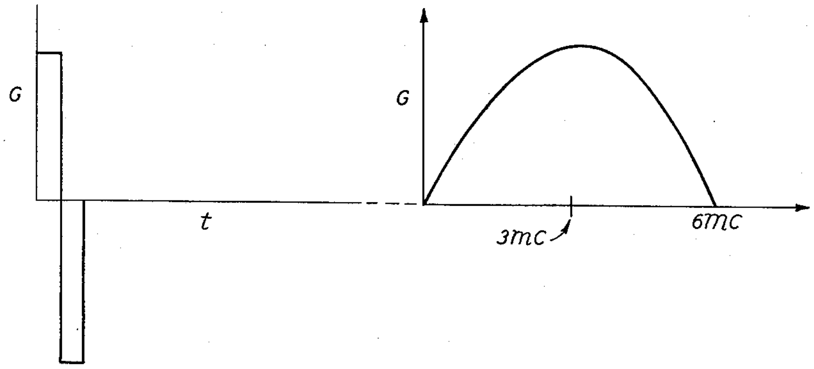

The operation of the multiplexing system is improved by increasing the energy of the pulses emanating from transmitter B in the transmission band of the high-pass filter 13. This increases the output of filter 13 and provides more energy in the path comprising bandpass filter 15, envelope detector 18, and low-pass filter 19. This increase in energy in the frequency spectrum of the pulses contained in the transmission band of filter 13 is accomplished in a variety of ways. First transmitter B may be adjusted to generate pulses or narrower width. Another technique is to apply the output of transmitter B to a blocking oscillator which generates an output pulse in response to the generation of an output pulse by transmitter B but which generates an output pulse substantially narrower than the input pulse from transmitter B. The output of the blocking oscillator may then be applied to high-pass filter 13. The effects of a narrow pulse are shown in FIG. 2A and FIG. 2B where a .33 microsecond pulse and a .16 microsecond pulse are shown together with their respective frequency spectrums. Transmitters A and B can, for example, both generate .33 microsecond pulses in which case the cut-off frequency of the low-pass filter 12 would be 2.5 megacycles, and the high-pass filter 13 transmission band would extend from 3.0 megacycles to infinity. For more energy in the receiver circuitry leading to regenerator 20, however, the pulses applied to filter 13 may be narrowed by one of the techniques described above to 0.16 microsecond pulses and the energy contained in the 3.0 megacycle to infinity transmission band thereby increased. This increase in energy is easily shown by comparing the area contained by the frequency curves to the right in FIGS. 2A and 2B which extend upward in frequency from 3.0 megacycles. To still further increase the energy in the frequency range beyond 3.0 megacycles the narrow 0.16 microsecond pulse may be applied to filter 13 and also delayed .16 microsecond inverted and applied to filter 13 to form a so-called "dipulse" which is shown in FIG. 2C. The energy contained in the transmission band of the filter 13 is now greater as may be seen by comparing the areas enclosed in that frequency range by the right-hand portions of FIGS. 2A, 2B, and 2C. At the receiving end of the system bandpass filter 15 has a response to a dipulse, which is shown in FIG. 3B, which has substantially the same envelope as that produced by the reception of a pulse and therefore the apparatus shown in FIG. 1 and described above is also employed when dipulses are transmitted by transmitter B.

In accordance with this invention bipolar pulse trains emanating from transmitters A and B may be multiplexed and transmitted. As described in United States Patent 2,996,578, issued to F. T. Andrews on August 15, 1961, a bipolar pulse train is a pulse train in which each binary "0" is transmitted as the absence of a pulse and each binary "1" is transmitted as a pulse opposite in polarity to the preceding pulse. Since the output of regenerators 16 and 20 is always a pulse of the same polarity regardless of the polarity of the transmitted pulse it is necessary to apply the output of each regenerator to a binary counter and then to a differentiator, as described in the above cited patent, to produce the originally transmitted bipolar pulse trains.

Figure 4:
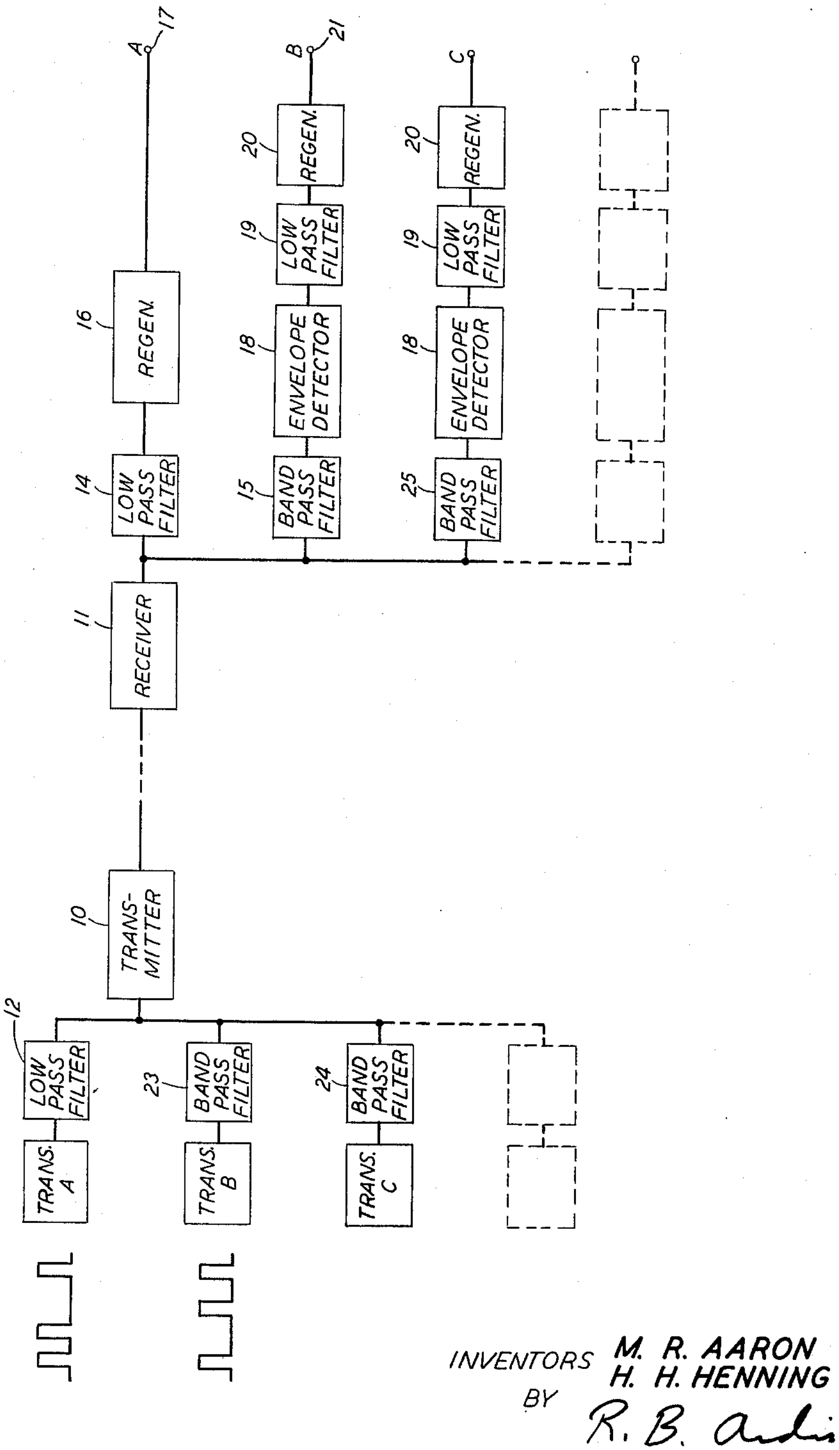
FIG. 4 is a block diagram of an asynchronous multiplexing system for multiplexing the signals from three or more pulse transmitters which embodies the invention.

In accordance with this invention the pulse signals emanating from three or more pulse transmitters may be multiplexed and transmitted. FIG. 4 illustrates the manner in which this may be accomplished and contains but one significant difference from an extension of FIG. 1. In FIG. 4 as opposed to FIG. 1, high-pass filter 13 has been replaced by bandpass filter 23 at the output of transmitter B and all succeeding pulse transmitters such as transmitter C employ bandpass filter 24, and so forth, connected to their outputs. The transmission bands of bandpass filters 23, 24, and so forth, do not coincide with one another, so that the outputs of the bandpass filters are separated in the frequency domain. In all other respects the circuitry shown in FIG. 4 is identical to the circuitry shown in FIG. 1 except, of course, that additional channels have been added. The necessity for employing bandpass filters at the transmitting end of the system whenever three or more channels are to be multiplexed is, of course, the result of having to separate the outputs from the pulse transmitters in the frequency domain and since the output of a high-pass filter extends from a given frequency to infinity such separation is not possible if a series of high-pass filters were employed. It should be emphasized that a bandpass filter can also be employed in the circuitry shown in FIG. 1 instead of high-pass filter B. Again, in accordance with this invention, three or more bipolar trains emanating from pulse transmitters A, B, and C, and so forth, may be multiplexed and transmitted with the only additional requirement, as described above, that of converting the outputs from the generators 16 and 20 into bipolar form.

Thus, in accordance with this invention, a plurality of pulse trains emanating from a plurality of pulse transmitters are multiplexed without the need for elaborate circuitry. One of the pulse trains is transmitted at baseband (that is, the output of transmitter A as described above) while the others are transmitted at higher frequencies. It should be recognized, however, that there is no necessity for transmitting one of the pulse trains at baseband and all of the transmitters may be connected to bandpass filters prior to transmission at frequencies higher than baseband and converted into double sideband amplitude modulated signals after reception by the techniques described above. In any case, despite the fact that a plurality of transmitters may be multiplexed and detected at the receiver by conventional amplitude modulation techniques there is no requirement for modulators in the apparatus and only passive filter networks are employed, thus a minimum of circuit complexity is required with a resulting low cost.

It is to be understood that the above-described embodiments are illustrative of the application of the invention. Numerous other arrangements may be devised by those skilled in the art without departing from the spirit and scope of the invention.

What is claimed is:

1. In a system for asynchronously multiplexing information bearing pulse trains, a plurality of sources of information bearing pulse trains, the frequency spectrums of said pulse trains being coextensive, a transmitting filter connected to receive pulses from each of said sources and having a pass band within said frequency spectrum but including no frequencies in the pass band of any other of said filters, means for directly applying the pulses from each of said pulse transmitters to a respective one of said transmitting filters, transmission means, means for applying the energy selected by said transmitting filters in common to said transmission means, a plurality of receiving filters corresponding to the number of said pulse sources, each of said receiving filters selecting a band of frequencies which corresponds substantially to the band of frequencies selected by a corresponding one of said transmitting filters, means for applying the signals transmitted by said transmission means to said receiving filters, and a pulse regenerator connected to receive the output of each of said receiving filters to reproduce the pulse train from the corresponding pulse transmitter.

2. In a system for asynchronously multiplexing information bearing pulse trains, a plurality of sources of information bearing pulse trains, the frequency spectrums of said pulse trains being coextensive, a transmitting bandpass filter connected to receive pulses from each of said sources and having a pass band within said frequency spectrum but including no frequencies in the pass band of any other of said filters, means for directly applying the pulses from each of said pulse transmitters to a respective one of said transmitting bandpass filters, transmission means, means for applying the energy selected by said transmitting bandpass filters in common to said transmission means, a plurality of receiving filters corresponding to the number of said pulse sources, each of said receiving filters selecting a band of frequencies which corresponds substantially to the band of frequencies selected by a corresponding one of said transmitting filters, means for applying the signal transmitted by said transmission means to said receiving bandpass filters, each of said receiving bandpass filters producing an output signal having a pulse envelope whenever a pulse is applied to the input of the corresponding transmitting bandpass filter, an envelope detector connected to the output of each of said receiving bandpass filters, and a regenerator connected to the output of each of said envelope detectors to reproduce the pulse trains emanating from the pulse transmitters.

3. In a system for asynchronously multiplexing information bearing pulse trains, a plurality of sources of information bearing pulse trains, the frequency spectrums of said pulse trains being coextensive, a low pass transmitting filter having a pass band in the lower portion of said frequency spectrum and directly connected to receive the pulses from a first of said pulse sources, a transmitting bandpass filter connected to receive pulses from each of said sources other than the first of said pulse sources and having a pass band within said frequency spectrum but including no frequencies in the pass band of any other of said transmitting bandpass filters and said transmitting low pass filter, means for directly applying the pulses from each of said pulse sources other than said first pulse source to a respective one of said transmitting bandpass filters, transmission means, means for applying the energy selected by said transmitting low pass filter and said transmitting bandpass filters in common to said transmission means, a receiving low pass filter selecting a band of frequencies which corresponds substantially to the band of frequencies selected by said low pass transmitting filter, a plurality of bandpass receiving filters corresponding to the number of said pulse sources other than said first pulse source, each of said receiving bandpass filters selecting a band of frequencies which corresponds substantially to the band of frequencies selected by a corresponding one of said transmitting bandpass filters, means for applying the signal transmitted by said transmission means to said receiving low pass filter so that an output signal is generated by said receiving low pass filter when said first pulse source generates an output pulse, means for applying the signal transmitted by said transmission means to said receiving bandpass filters, each of said receiving bandpass filters producing an output signal having a pulse envelope whenever a pulse is applied to the input of the corresponding transmitting bandpass filter, a regenerator connected to the output of said receiving low pass filter to generate an output pulse whenever the first of said pulse transmitters generates an output pulse, an envelope detector connected to the output of each of said receiving bandpass filters, and a regenerator connected to the output of each of said envelope detectors to reproduce the pulses emanating from said pulse sources other than said first pulse source.

4. In a system for asynchronously multiplexing information bearing pulse trains, two sources of information bearing pulse trains, the frequency spectrum of said pulse trains being coextensive, a low pass transmitting filter having a pass band in the low frequency portion of said frequency spectrum and directly connected to receive the pulses from a first of said pulse sources, a transmitting bandpass filter having its pass band in a portion of said frequency spectrum different from that of said low pass transmitting filter, means for directly applying the pulses from the second of said pulse sources to said transmitting bandpass filter, transmission means, means for applying the energy selected by said transmitting low pass filter and said transmitting bandpass filter in common to said transmission means, a receiving low pass filter for the first pulse source having a pass band which corresponds substantially to the pass band of said transmitting low pass filter, a receiving bandpass filter for the second of said pulse sources having a pass band which corresponds substantially to the pass band of said transmitting bandpass filter, means for applying the signal transmitted by said transmission means to said receiving low pass filter and said receiving bandpass filter in common so that said receiving low pass filter generates an output pulse whenever the first pulse source generates an output pulse and said receiving bandpass filter produces an output signal having a pulse envelope whenever a pulse is generated by the second pulse source, an envelope detector connected to the output of said receiving bandpass filter, a regenerator connected to the output of said receiving low pass filter to generate an output pulse whenever the first pulse source generates an output pulse, and a regenerator connected to the output of said envelope detector to generate an output pulse whenever the second of said pulse sources generates an output pulse.

References Cited by the Examiner

UNITED STATES PATENTS

| | | | |
|---|---|---|---|
| 2,759,045 | 8/56 | Young | 340—171 |
| 2,996,578 | 8/61 | Andrews | 178—7 |

DAVID G. REDINBAUGH, *Primary Examiner.*